United States Patent Office 3,029,596
Patented Apr. 17, 1962

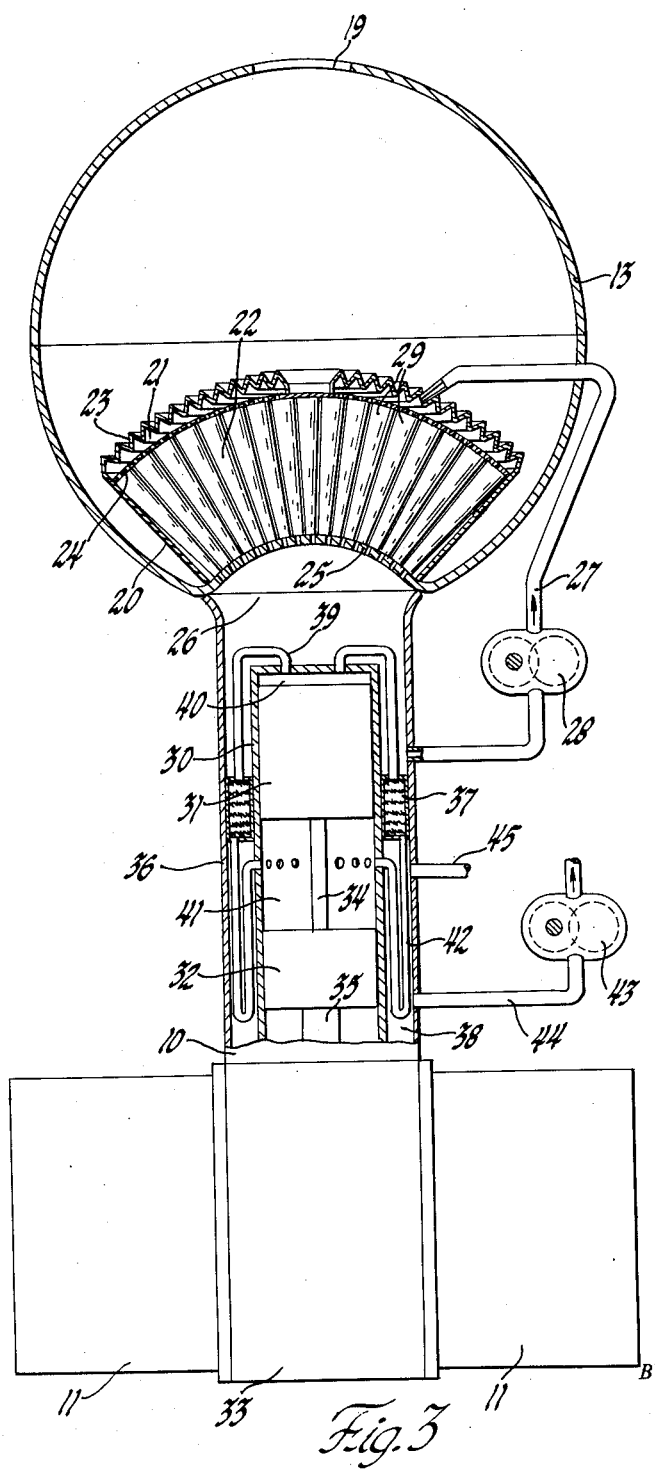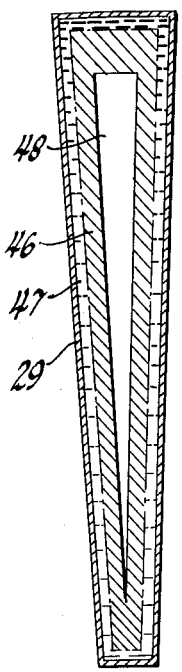

3,029,596
POWER PLANT HEAT STORAGE
ARRANGEMENT
Robert J. Hanold, Cleveland, Ohio, and Robert D. Johnston, Brownsburg, Ind., assignors to General Motors Corporation, Detroit, Mich., a corporation of Delaware
Filed Nov. 17, 1959, Ser. No. 853,497
11 Claims. (Cl. 60—24)

This invention relates to heat storage arrangements for power plants and, more particularly, to a heat storage arrangement for a Stirling cycle engine.

Power plants that produce shaft horsepower generally operate by heat energy and in many instances it is desirable to have the power plant operate continuously even though its primary source of heat energy is but intermittently effective. For example, a power plant that relies on solar energy as a heat source can only operate during the sunlight hours unless some means are provided to store excess heat during the sunlight hours to operate the power plant at other times. Submarine power plants which rely on fuel combustion as a heat source present a similar situation as they cannot burn fuel when fully submerged and accordingly require some form of energy storage which can be a heat storage arrangement in place of the more common electrical battery storage.

The invention is directed to providing a power plant with a high capacity heat storage arrangement of exceptionally low weight and volume and is further directed to incorporating such heat storage arrangement with a Stirling cycle engine, as the mating of this type of engine with the particular heat storage arrangement affords unusual advantages in size, weight, efficiency and simplicity.

The illustrated embodiment of the invention presents a satellite power plant and heat storage arrangement in which sufficient solar energy is accumulated during the intermittent periods that the satellite is exposed to the sun's rays to operate the Stirling cycle engine continuously during those periods and also during the periods of non-exposure. It should be realized, of course, that the invention is likewise applicable to earth-bound power plant installations utilizing the sun's rays or an intermittent fuel supply as the heat source.

In the drawings:

FIGURE 3 is an elevational view, partially broken away, of the power plant, and

FIGURE 4 is a sectional view of a heat storage capsule taken through the axis thereof.

Figure 1:
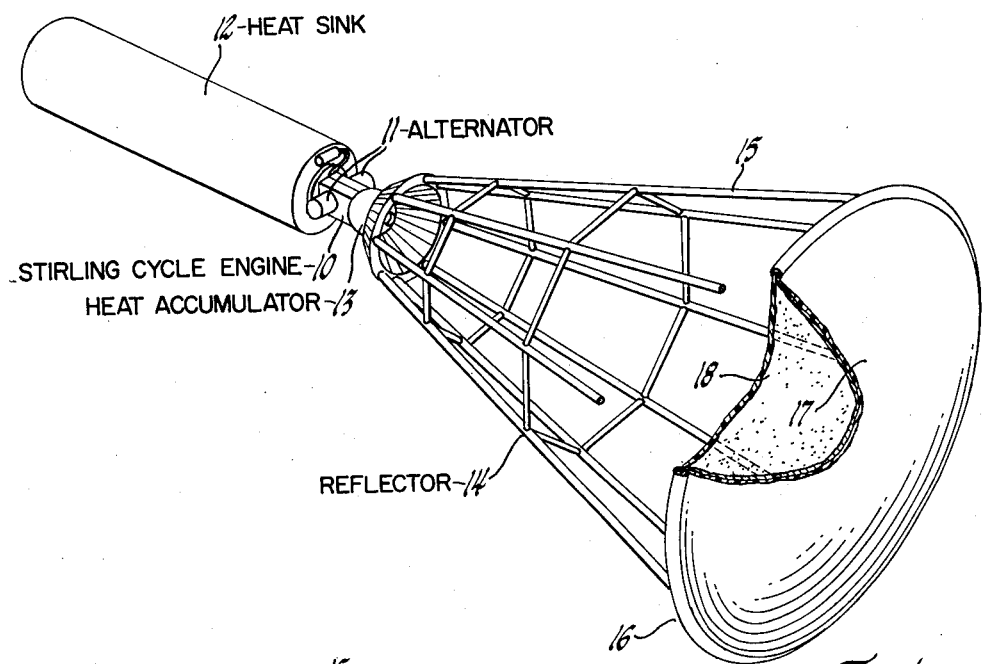
FIGURE 1 is a perspective view of the major components of a satellite type solar power plant incorporating the invention.

Referring now to FIGURE 1, the satellite power plant includes a Stirling cycle engine 10 which produces shaft horsepower to operate a pair of alternators 11 which in turn operate other equipment such as radios and orientation controls. The engine 10 is mounted on the last stage fuel tank 12 of the rocket which puts the power plant in orbit and serves as a radiator or heat sink for the engine. A heat absorber and accumulator 13 is mounted on the head of the engine 10 and, in turn, carries an inflated solar energy reflector 14.

The reflector is deflated prior to orbit and comprises a plurality of inflatable struts 15 and a lenticular shaped balloon 16 carried thereby. The balloon 16 has a reflective coating on the interior of the outermost wall 17 while the innermost wall 18 is transparent. The orientation control system of the satellite aims the radiator 12 at the sun so that the solar rays will reflect off the collecting mirror wall 17 and be directed to the absorber and heat accumulator 13. The reflector 14 may be inflated by gas pressure and the struts 15 and back wall 17 may be rigidized, if desired, by the injection of plastic foam-forming materials after inflation.

Figure 2:
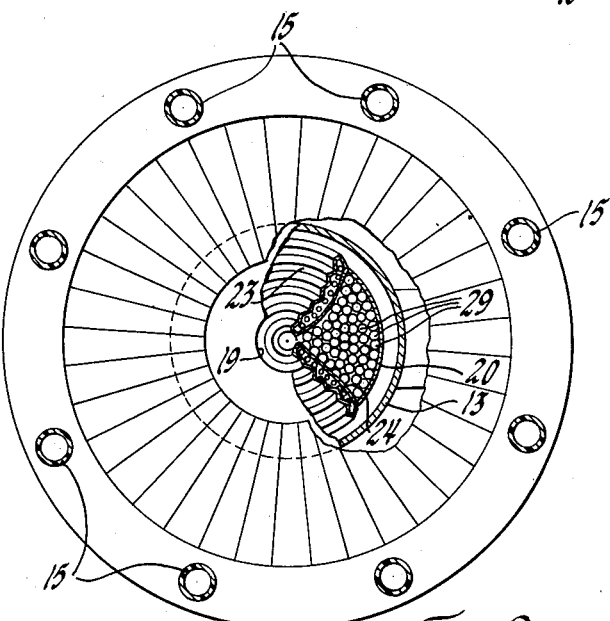
FIGURE 2 is a sectional view, partially broken away, across the axis of the power plant.

Referring now to FIGURES 2 through 4, the heat absorber and accumulator 13 and Stirling cycle engine 10 have their structural parts fashioned, for the most part, of high temperature, high strength metal alloys such as stainless steel. The heat absorber and accumulator 13 consists of a hollow sphere having an aperture 19 through which the concentrated solar rays are directed onto the upper surface of a generally cup-shaped casing 20 which forms a pair of connected enclosures 21 and 22. The upper wall 23 of the enclosure 21 is ridged to provide a large number of concentric ring surfaces which cooperate with the inner wall of the sphere 13 to confine reflections to the interior of the sphere and thus obtain maximum utilization of the solar energy.

The enclosure 21 is connected to the enclosure 22 through a perforated wall 24 which has the general shape of a spherical segment and the enclosure 22 has a similar perforated bottom wall 25 to place it in communication with a Stirling cycle engine heater enclosure 26. A conduit 27 connects the engine heater enclosure 26 to the heat absorber enclosure 21 and a pump 28, which may be driven from the engine crankshaft or electrically from the alternators 11, provides a means for recirculating a heat transfer fluid through the enclosures 21, 22 and 26.

The heat transfer fluid is a suitable material that will convey heat from the absorber and accumulator enclosures 21 and 22 to the engine heater enclosure 26. In the specific illustrated design, a liquid metal alloy of sodium and potassium is utilized as the heat transfer fluid for it has reasonably high heat capacity, an excellent film coefficient and a low vapor pressure at the engine operating temperature which is in the neighborhood of 1250° F.

The heat storage enclosure 22 is packed with a plurality of nested, cone-shaped, stainless steel containers 29 which serve to soak up heat from the heat transfer fluid when the radiant heat source is effective, such heat being in excess of that required for normal operation of the engine. The heat storage containers or capsules 29 return the acquired excess heat to the heat transfer fluid when the radiant heat source is ineffective to provide continued operation of the engine.

The engine 10 operates on the Stirling cycle and incorporates the most recent design advances. Reference may be had to the Philips Technical Review, volume 29, No. 9, pages 245–262, 1958/1959, for a detailed disclosure of the advanced Stirling cycle engine which includes, briefly, an engine cylinder 30 containing a displacer piston 31 and work piston 32 which operate crankshaft means in the crankcase 33 by coaxial reciprocating piston rods 34 and 35, the alternators 11 being driven by the crankshaft means. An outer casing 36 encloses the cylinder 30 to form the engine heater enclosure 26, a regenerator enclosure 37 and a cooler enclosure 38. Heater conduits 39 connect the engine working fluid hot space 40 to the engine working fluid cold space 41 by way of the regenerator 37 and cooler conduits 42, the regenerator space being filled with stacked, fine wire mesh elements that serve as heat storage means for the working fluid that is shuttled between the hot and cold spaces on piston movement. The pump 28 recirculates the heat transfer fluid through the heater enclosure 26 to furnish heat energy to the engine working medium and a pump 43 circulates a coolant fluid, such as water, between the cooler enclosure 38 and the radiator 12 by way of conduits 44 and 45 to provide a heat sink for the engine. The disclosured engine, by way of example, has a 2.96 cubic inch displacement and is designed to produce 5.7 horsepower at 3600 r.p.m. with a heater temperature of 1250° F., a cooler temperature of 150° F. and a working fluid of helium at an average system pressure of 1250 pounds per square inch.

Since it is required that the power plant be able to operate for considerable periods of time when the heat source is ineffective, as in the case of the satellite being in darkness, it is necessary that the heat accumulator 22 possess an unusually high heat storage capacity. The heat storage capsules 29 therefore contain heat storage substances which have such capacities. The preferred substances are lithium compounds such as lithium hydride, lithium hydroxide and lithium fluoride. Lithium hydride, for example, is a translucent crystalline mass in the solid state, has a melting point of 1256° F. and a heat of fusion in the neighborhood of 1500 B.t.u.'s per pound.

In order to maintain a substantially constant engine power output during the entire orbit, it is desirable that the heat transfer fluid enter the engine heater enclosure 26 at a substantially constant temperature. The heat capsules 29 are therefore shaped to provide a substantially constant rate of heat rejection and absorption to the heat transfer fluid and a sufficient number are utilized to operate the engine from the heat of fusion of the lithium hydride. The lithium hydride releases and absorbs a great amount of heat while changing state and it is therefore possible to supply sufficient heat to run the engine in the immediate neighborhood of 1256° F. The lithium hydride will, of course, continue to supply heat on cooling to lower temperatures so that it can provide efficient operation of the engine down to 800° F. but, for constant power output, it is more desirable that operation take place at the change of state temperature.

Referring particularly to FIGURE 4, the container 29 is shown as containing lithium hydride in the crystalline state at 46 and in the liquid state at 47. The central portion 48 of the container 29 is filled with an inert gas to provide accommodation for thermal expansion of the lithium hydride during the change from solid to liquid. With a weightless condition, as in orbit, the space 48 will be centrally located due to the wetting action of the lithium hydride on the walls of the container. The space 48 would appear at the top of the container in a ground installation.

The conical containers 29 store the largest amount of lithium hydride at the top of the accumulator enclosure 22 where the heat flow rate is the greatest. The conical shape of the containers insures that the fusion front approaches the center of the container at a rate which is independent of axial location and thus stabilizes the temperature of the heat transfer fluid fed to the engine heater enclosure to within a few degrees of the lithium hydride melting point. The conical shape of the containers 29 also permits them to be closely packed in the cup or funnel-shaped casing 20 which, in turn, fits well in the spherical shell 13. The close nesting of the containers 29 provides adequate passages for the flow of the heat transfer fluid which has an excellent convection film coefficient with the container walls so that the flow velocity may be low.

We claim:

1. Apparatus for providing continuous operation from an intermittently effective heat source of a Stirling cycle engine including means defining a hot chamber, a regenerator, conduit means connecting said hot chamber with said regenerator, means defining a cold chamber, means connecting said cold chamber with said regenerator, a working gas medium in said conduit means, regenerator and chambers and comprising several connected enclosures containing a heat transfer fluid and means for circulating the heat transfer fluid between the several enclosures, the several enclosures including a heat absorption enclosure wherein heat in excess of that required for normal operation of the engine may be intermittently supplied to the heat transfer fluid from the heat source, an engine heater enclosure for said hot chamber and conduit means wherein heat may be continually supplied to said working medium of the engine from the heat transfer fluid, and a heat storage enclosure including separate container means immersed in the heat transfer fluid and having a heat storage substance therein characterized by a high heat of fusion and a melting point above 800° F. and less than the normal operating temperature of the engine so that heat in excess of that required for normal operation of the engine may be acquired from the heat transfer fluid by the heat storage substance by the melting thereof when the heat source is effective and so that the acquired excess heat may be returned to the heat transfer fluid from the heat storage substance by the solidification thereof for continued operation of the engine when the heat source is ineffective.

2. Apparatus in accordance with claim 1 wherein the heat storage substance is a metal compound.

3. Apparatus in accordance with claim 1 wherein the heat storage substance is a metal compound selected from the group consisting of lithium hydride, lithium fluoride and lithium hydroxide.

4. Apparatus in accordance with claim 1 wherein the heat transfer fluid is a liquid metal.

5. Apparatus in accordance with claim 1 wherein the heat transfer fluid is an alloy of sodium and potassium.

6. Apparatus in accordance with claim 1 wherein the melting point of the heat storage substance is but slightly less than the normal operating temperature of the engine.

7. Apparatus in accordance with claim 6 wherein the heat transfer fluid flows from the heat absorption enclosure to the heat storage enclosure, along the length of the container means therein, and then to the engine heater enclosure for subsequent return to the heat absorption enclosure, the container means being so shaped along its length as to present decreasing cross-sectional areas of the contained heat storage substance taken transversely to the direction of flow of the heat transfer fluid with the greater cross-sectional areas being at the inlet end of the heat storage enclosure so that even melting and solidification occurs through the length of the container means to thus stablize the temperature of the heat transfer fluid at the inlet of the engine heater enclosure.

8. Apparatus in accordance with claim 7 wherein the heat storage enclosure is generally cup-shaped and wherein the container means comprises a plurality of cone-shaped capsules nested in the enclosure in side-by-side relation.

9. Apparatus in accordance with claim 8 wherein the heat transfer fluid is a liquid metal and wherein the heat storage substance is a lithium compound selected from the group consisting of lithium hydride, lithium fluoride and lithium hydroxide.

10. Heat storage apparatus comprising an enclosure containing a heat transfer fluid, a container means of substantial length in the enclosure and immersed in the heat transfer fluid, the container means having a heat storage substance therein characterized by a melting point in excess of 800° F. and less than the melting point of the container material and having a high heat of fusion, and means for flowing the heat transfer fluid through the enclosure along the length of the container means to melt the heat storage substance when its melting point is exceeded by the temperature of the heat transfer fluid and to solidify the heat storage substance when its melting point exceeds the temperature of the heat transfer fluid, the container means being so shaped along its length as to present decreasing cross-sectional areas of the contained heat storage substance taken transversely to the direction of flow of the heat transfer fluid with the greater cross-sectional areas being at the upstream end of the enclosure.

11. Apparatus in accordance with claim 10 wherein the enclosure is generally cup-shaped and wherein the container means comprises a plurality of cone-shaped capsules nested in the enclosure in side-by-side relation.

References Cited in the file of this patent

UNITED STATES PATENTS

| | | |
|---|---|---|
| 2,289,425 | Hogan | July 14, 1942 |
| 2,484,127 | Stelzer | Oct. 11, 1949 |
| 2,596,057 | Van Heeckeren et al. | May 6, 1952 |
| 2,693,939 | Marchant et al. | Nov. 9, 1954 |
| 2,808,494 | Telkes | Oct. 1, 1957 |
| 2,933,885 | Benedek et al. | Apr. 26, 1960 |
| 2,942,411 | Hutchings | June 28, 1960 |